United States Patent [19]

Stewart et al.

[11] 4,286,682
[45] Sep. 1, 1981

[54] MOTORIZED SKI BOB

[75] Inventors: Charles Stewart, Bourbonnais; Richard W. Condon, Frankfort, both of Ill.

[73] Assignee: Roper Corporation, Kankakee, Ill.

[21] Appl. No.: 948,583

[22] Filed: Oct. 4, 1978

[51] Int. Cl.³ .......................................... B62M 27/02
[52] U.S. Cl. ................................. 180/9.24 A; 180/184
[58] Field of Search ............... 180/9.24 A, 5 R, 29, 180/33 R, 33 C, 33 D, 180, 181, 184, 185, 190, 193, 9.26, 9.28, 210, 215, 217; 280/5 A

[56] References Cited

U.S. PATENT DOCUMENTS

| 3,157,913 | 11/1964 | Hubert | 180/9.24 A |
|---|---|---|---|
| 3,596,727 | 8/1971 | Grahm | 180/5 |
| 3,667,562 | 6/1972 | Compton | 180/9.24 A |
| 3,707,199 | 12/1972 | Gerich | 180/5 |
| 3,722,612 | 3/1973 | Issigonis | 180/227 |
| 3,766,999 | 10/1973 | Berguis | 180/5 |
| 3,788,412 | 1/1974 | Vincent | 180/5 R |
| 3,794,131 | 2/1974 | Freedman | 180/9.24 A |
| 3,799,565 | 3/1974 | Burtis | 180/190 |
| 3,822,755 | 7/1974 | Hine | 180/9.24 A |
| 3,872,938 | 3/1975 | DeGroot | 180/185 |
| 3,872,944 | 3/1975 | Shapiro | 280/278 |
| 4,169,512 | 10/1979 | Ishikawa | 180/227 |

FOREIGN PATENT DOCUMENTS

| 1816274 | 6/1970 | Fed. Rep. of Germany | 180/5 |
|---|---|---|---|
| 2003327 | 8/1971 | Fed. Rep. of Germany | 180/5 |

Primary Examiner—John J. Love
Assistant Examiner—Randall A. Schrecengost
Attorney, Agent, or Firm—Fitch, Even, Tabin, Flannery & Welsh

[57] ABSTRACT

A compact power driven ski bob is attained by locating the driving tracks of a rear power ski beneath the seat and pivotally mounting the front end of the power ski longitudinally forward of the seat. The rear end of the power ski is biased into engagement with the snow and is located lower than the front end of the ski to enhance driving contact with the snow. The seated operator is cushioned from impact forces and up and down movements of the power ski by a rear attachment means comprising a lost motion connection and a shock absorber. To aid in transportation of the snow bob, the front ski and the fuel tanks are detachably connected to the frame.

12 Claims, 4 Drawing Figures

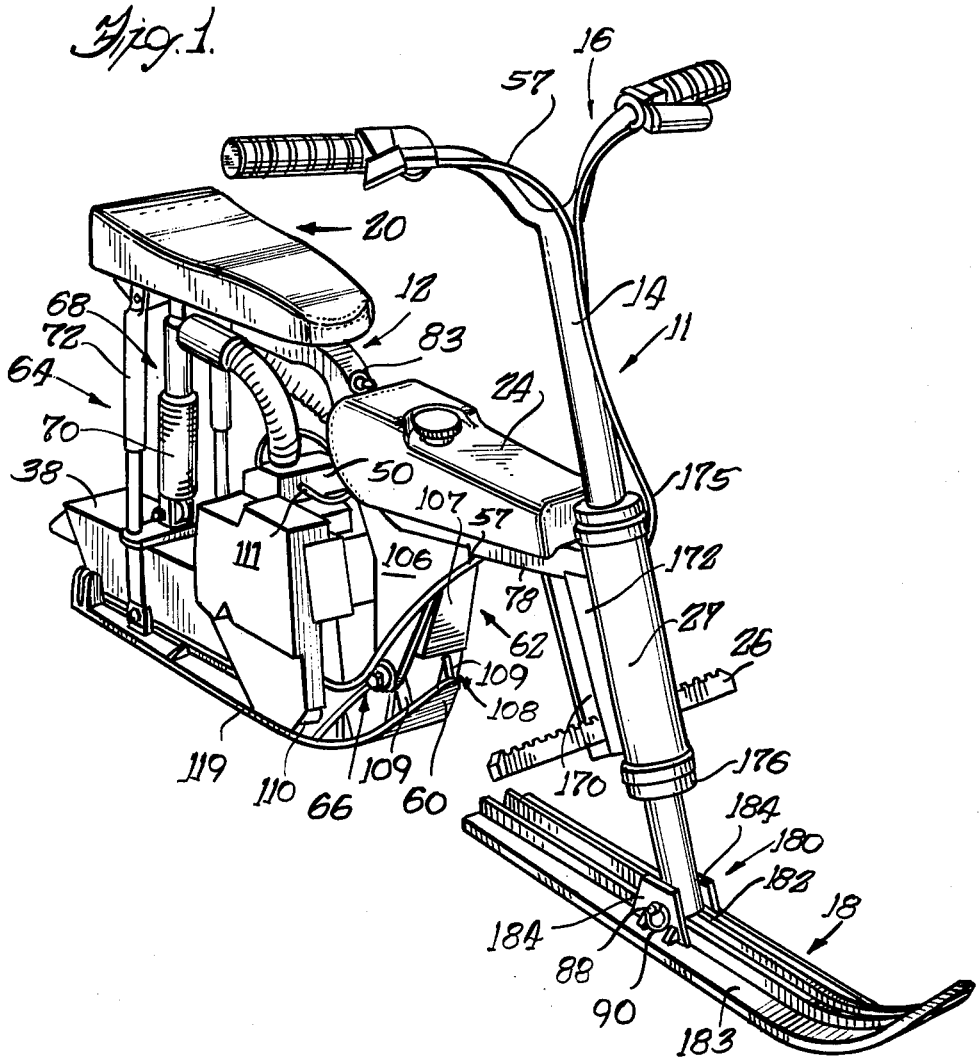
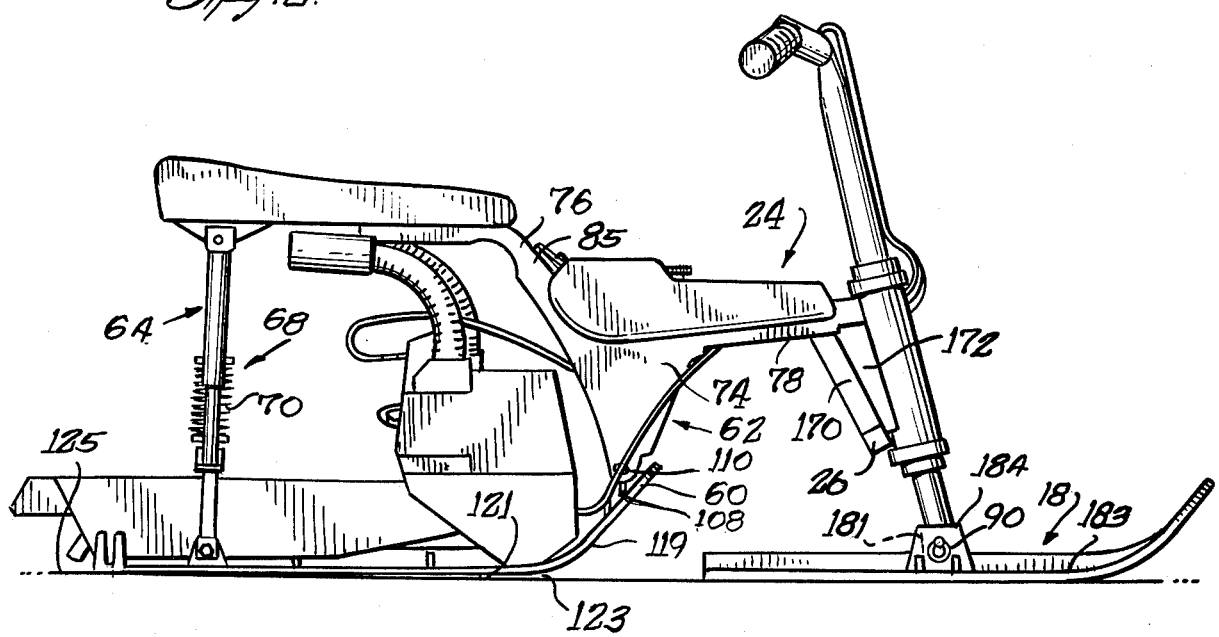

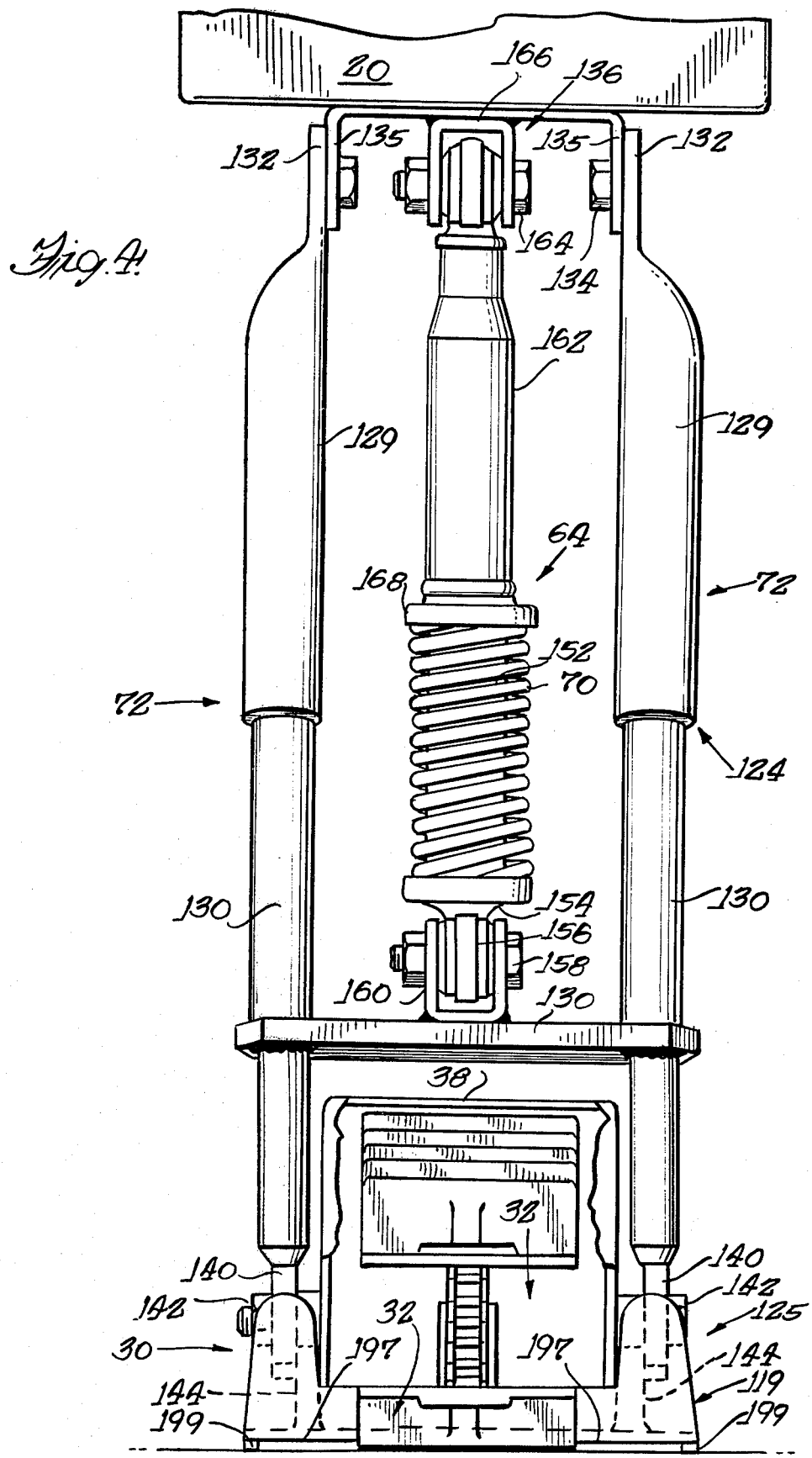

MOTORIZED SKI BOB

This invention relates to a power driven vehicle of the snow bob kind.

Motorized ski vehicles of the ski bob type have been built in the past by hobbyists or others on a small scale basis without sufficient concern as to cost or features required for a mass produced item to be mass marketed to the general public. That is, the vehicles have been constructed in a generally expensive manner for the few persons who have had sufficient economic interest and sufficient athletic talents to handle such snow bobs. Thus, the prior art snow bobs have been generally prototype constructions without sufficient engineering design and attention paid to size, weight, cost and maneuverability and other design considerations for a snow bob to be driven by the general public, many of whom are not overly athletic and who will require a well designed and well balanced snow bob to make up for their lack of balance or coordination.

The prior art, insofar as known at this time, is exemplified by U.S. Pat. No. 4,109,739 and published German patent application No. 2,003,326. Each of these patents discloses a very long ski bob in which the rider is seated substantially forward of an endless drive track. In these ski bobs, the drive track is positioned and extends rearwardly of the seat for a substantial distance and is unsupported at its rearward end by the flame. Furthermore, these ski bobs have a long anterior ski portion on the power ski extending forwardly of the occupant's seat, resulting in a very long power ski with a forward sliding portion and a rearward drive track. On the other hand, the present invention provides a shorter ski bob resulting in reduced cost and also resulting in a more easily transportable ski bob, such as for example, a ski bob capable of being transported in a trunk of an automobile. Also, the center of gravity for an occupied ski bob disclosed in the aforesaid U.S. patent is too far forwardly and the weight is not concentrated sufficiently at the rear of the power ski to provide the traction desired under various snow and ice conditions. These same shortcomings are also present in the ski bob disclosed in the aforementioned German patent application.

Another proposal for a ski bob is set forth in published German patent publication No. 1,816,274, showing a seat located over and intermediate the ends of the drive track. In this ski bob, the driving track and the rear ski are effective independently in either a driving mode or a sliding mode. In the driving mode, the rear ski is swung to the side, leaving only the driving track in engagement with the snow. On the other hand, in the sliding mode the ski is swung down beneath the driving track lifting the track upwardly out of an effective propelling engagement with the snow. Thus, the ski bob proposed in published German patent application No. 1,816,274 contemplates sliding with the track elevated, whereas the present invention contemplates a continually powered condition with the rear ski and the propelling track cooperatively in tracking engagement with the snow or ice and cooperatively supporting the weight of the operator.

The present invention is particularly directed to a compact snow bob with the rider being cushioned from high impact loads experienced in traversing rough and bumpy terrain. To this end, the power ski of the present invention is pivoted at its front end to allow the rear end to travel up and down and a lost motion connection and a shock absorber between the seat and the rear end of the power ski attenuate the up and down movement of the seat and the shocks being applied thereto.

Further, to enhance the mass appeal for such snow bobs, it is preferred that they be capable of being stowed in a relatively small space and to be easily and safely transported particularly by automobile. To this end, the preferred ski bob has a detachable front ski, and a detachable gas tank which can be stowed separately from the main frame. Preferably, the ski bob can be stowed in the trunk of an automobile if it has a moderately sized trunk space, after detaching the front ski and fuel tank. When the desired destination is reached, the front ski and fuel tank are secured in position on the ski bob with quick connect means.

Accordingly, an object of the present invention is to provide a new and improved ski bob of the foregoing kind.

Another object of the invention is to provide a low cost bob having features making it marketable to the public on a mass scale.

These and other objects of the invention will become apparent from the following detailed description taken in connection with the accompanying drawing in which:

FIG. 1 is a perspective view of a ski bob constructed in accordance with the invention and embodying the novel features of the invention.

FIG. 2 is a side elevational view of the ski bob in FIG. 1, but reduced in size.

FIG. 4 is an enlarged rear view of a ski bob.

Figure 3:
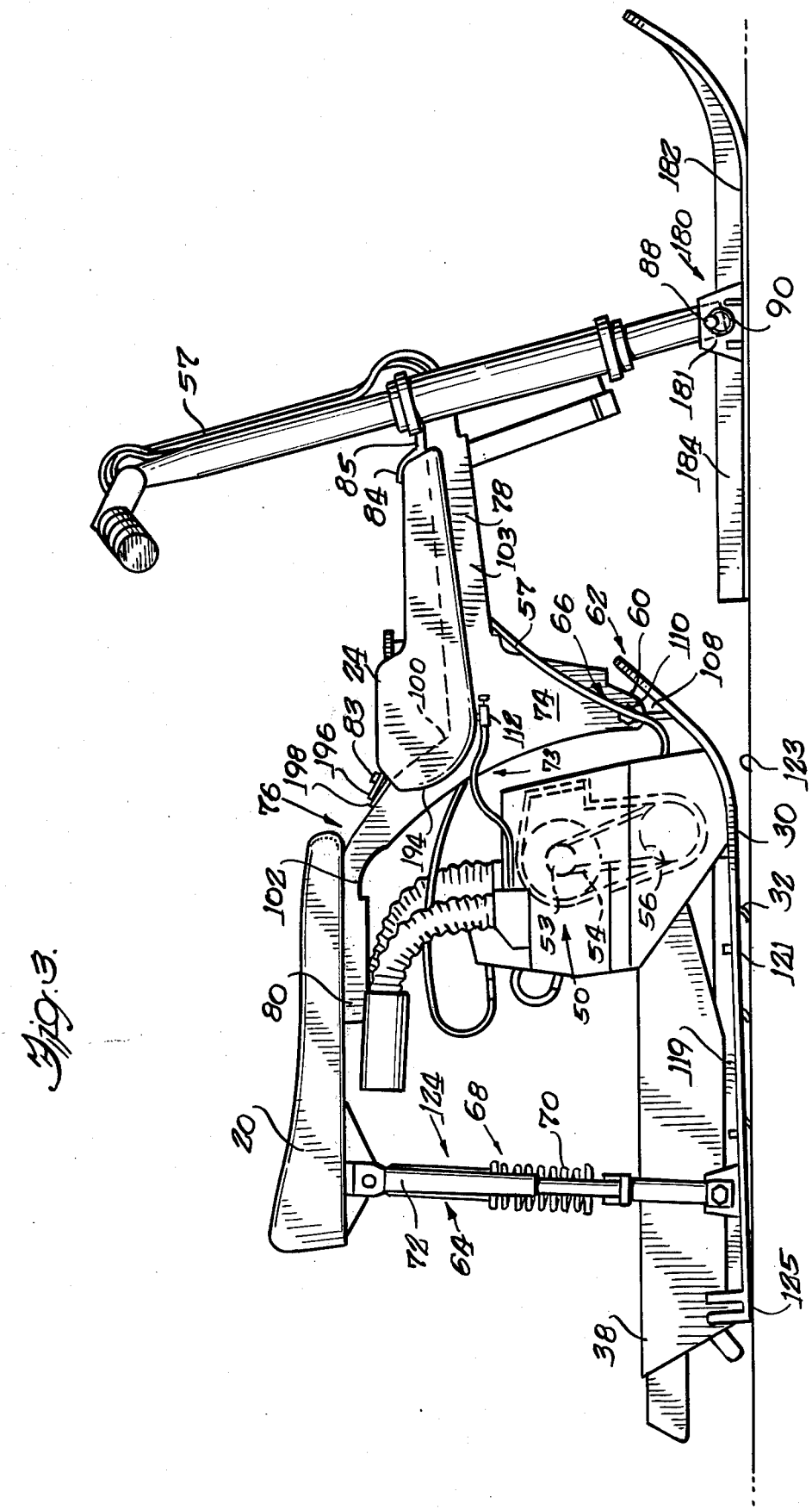
FIG. 3 is an enlarged side elevational view of a ski bob.

As shown in the drawings for purposes of illustration, the invention is embodied in a motorized snow vehicle 11 of the snow bob kind having an upstanding main frame 12 in the forward end of which is journaled an upright steering post 14 carrying a handlebar 16 at its upper end. A front turning ski 18 is attached to the lower end of the steering post which is turned by the operator to steer the ski bob. The rider sits on a seat 20 at the rear portion of the frame with his hands on the handlebars 16 and with his legs astride a central cross portion of the frame carrying a gas tank 24 with his feet resting on a transversely extending footrest bar 26 disposed near the lower end of a cylindrical frame tube 27 in which is journaled the steering post 14. The vehicle is propelled by a rear power ski 30 which includes an endless driving track 32 (FIG. 3) having a lower run at which the track is in engagement with the snow and moving rearwardly and an upper return run in which the track is moving forwardly across the top of the power ski 30 and within an enclosed protective housing 38 (FIG. 1). A gasoline motor 50 is disposed beneath the seat 20 and supported by the power ski 30 near its front at a location over the power track. An output shaft 53 from the motor drives a belt 54 which drives a sheave 56 connected to a drive sprocket (not shown) for the endless propulsion track 32. Suitable cable controls 57 extend from the handlebar 16 to the motor 50 allowing the operator to control the acceleration and braking of the motor and thereby the propulsion track 32.

Heretofore, snowbobs typically had a long anterior portion on the power ski with a long posterior driving track extending rearwardly of the occupant's seat location. It has been found that the total length of the power ski was considerably longer than needed and that this construction resulted in a propelling track which was relatively unsupported at the rear end thereof. Further, the occupant is seated forwardly of the propelling track so that his weight is not bearing downwardly on the track resulting in a loss of traction. The longer length of the ski bob is also thought to be deterimental to the balancing and steering characteristics for these prior art ski bobs.

In accordance with the present invention there is provided a new and improved ski bob having a shorter length and having the operator seated substantially over the power ski so that the operator's weight is directed down onto the power ski to keep the power track 32 in good driving relation to the snow. Weight distribution is best when 60% to 80% of the ski bob-rider combined weight is located over the power ski. This is achieved by locating most of the power ski under the seat 20 and attaching a forward pointed end 60 of the power ski and attaching the power ski to the frame by a forward attachment means 62 at a location forward of the seat and by a rearward attachment means 68 located longitudinally at the rear of the seat. To provide a cushioned ride and a good tracking capability, particularly over rough terrain, the power ski 30 is pivotally connected to the frame 12 at the forward attachment means by a pivot means 66 and at the rearward attachment means is connected by a lost motion and biasing means 64 which allows up and down movement of the rear end of the power ski 30 relative to seat and the rider thereon. Further, the biasing means 68 assures that the rear end of the power track has a good "bite" or traction, especially in soft snow. Thus, the rear end of the power ski 30 is biased into driving engagement with the snow and the seat is cushioned from some of the bumps and displacement as the rear end of the ski travels over rough terrain.

Further, as best seen in FIGS. 2 and 3, the front end of the power ski is inclined upwardly relative to the rear end of the ski to assure that a biasing means 68, which the present embodiment comprises a spring 70, will be compressed when the occupant sits on the vehicle. The lost motion connection is preferably afforded by a pair of telescoping tubes 72 which further telescope into each other when the rider sits on the seat and the latter lowers relative to its unoccupied position.

A compact and an inexpensive frame 12 is preferably provided by terminating the rear end of the frame's central cross bar 78 in a generally bifurcated section 73 comprising a depending and rearwardly extending arm 74 and an upwardly and rearwardly extending arm 76. Stated differently, the frame will be thought of as having a "Y" configuration with a central cross bar 78 and a pair of arms 74 and 76. A generally horizontal frame section 80 is attached to the upper bifurcated arm 76 and has mounted thereon the seat 20.

As will be explained in greater detail to aid in portability of the snow bob, the gas tank 24 may be detached from its nested relationship (FIG. 4) at the top side of the cross bar 78 by removal of a quick disconnect pin 83 and the sliding of a front lip 84 on the gas tank from beneath a clip 85 on a cross bar 78 adjacent the column 27. Also, the aid in portability, particularly in autos, the front ski 18 is connected by a pivot pin 88 which has a pull ring 90 inserted through an aperture in the pin 88. By pulling the ring 90 and removing the pivot pin 88, the front ski may be detached from the lower end of the steering post 14.

Referring now in greater detail to the individual components of the ski bob 11, the preferred frame 12 comprises an upper longitudinally extending, tubular member which is bent at a first corner 100 (FIG. 3) to define the upwardly extending arm 76 and then is bent at a corner 102 to define the seat support section 80. The forward section of this tubular member defines the cross bar 78 which supports the gas tank 24. By way of example, the tubular member may be a hollow, generally square cross sectioned, tube measuring about 1.5 inch on each side. Adjacent the bend 100 in the tubular member is the depending leg 74, which is a generally triangular shaped channel having a pair of depending sidewalls 106, best seen in FIG. 1 joined to a front base wall 107. A mounting bracket 108 on the power ski tip 60 extends upwardly between the sidewalls 106 and is connected thereto by the pivot means 66.

As best seen in FIG. 1, the ski's mounting bracket 108 comprises a pair of spaced upstanding flanges 109 which are positioned in close proximity to the respective inner sides of the sidewalls 106 and the pivot means comprises a pivot pin 110 extending horizontally through aligned apertures in the two sidewalls 106 and the two flanges 109.

A gas line 111 extends from the gas tank 24 to the motor 50 and may be extended along the leg 74, as best seen in FIG. 3; the gas line 111 extending from a lifting 112 located on the underside of the fuel tank 24 down along the frame to the motor. The front gase wall 107 of the leg 74 prevents snow from blowing directly back into the motor when the ski bob is in motion. It is preferable to mount the motor 50 directly onto the power ski with the motor supported by a pair of spaced upstanding support plates which are fastened at their lower ends to the upstanding brackets molded integral with the ski body 119.

To improve traction by the driving track 32, the location of the pivot pin 110 for mounting the ski is such that the front end of the power ski 30, as best seen in FIG. 3, is disposed upwardly of the ground line 123 and of the rear end 125 when the latter is resting on the ground line 123. By way of example, the front end of the ski is normally 0.5 to 1.5 inch higher than the rear end of the ski, the distance being exaggerated in the drawings for purposes of better illustration. When the rider mounts the ski bob, his weight will push the front end of the ski down to have the entire flat under surface 121 of the power ski in engagement with the ground line 123 and this will be accompanied by a compression of the biasing means 64 which is part of the attachment means at the rear of the power ski.

The rear end of the power ski 30 is stabilized and held by a lost motion connecting means 124 which includes the telescoping tubes 72 and by the biasing means 64. The telescoping tubes 72 comprise upper larger diameter tubes 129 into which are projected the upper ends of smaller diameter, axially aligned lower tubes 130. The maximum displacement permitted before the telescoping tubes bottom out, is in this instance about two inches. In this instance, a 300 pound person will compress the biasing means 64 sufficiently to bottom out the telescoping tubes with two inches of downward displacement of the seat.

The upper end of the telescoping tube 129 has, as best seen in FIG. 4, a flattened, apertured portion 132 connected by a suitable fastening means, for example, bolt and nut 134 to depending flanges 135 of a U-shaped bracket 136 fastened to the underside of the seat 20, which is to be considered an extension of horizontal frame section 80. The lower telescoping tubes 130 are braced and fastened together to maintain a parallel relationship by a cross plate 138 welded thereto. The lower end of the lower tubes 130 have flattened portions 140 which are pivotally fastened by bolt and nut 142 to spaced, upstanding brackets 144 molded integral with the ski body 119. The telescoping tubes 129 and 130 have sufficient clearance to move generally rectilinearly while the brackets 144 move in an arc about the center of the pivot pin 110 at the front of the power ski 30. The stabilization against swaying of the power ski is assisted by the engagement of the flat vertical sides of the respective telescoping tubes and their respectively associated brackets.

The biasing means 64 cushions the ride and biases the rear end 125 of the power ski 30 against snow when a rider sits on the seat 20. The biasing means 64, in this instance, comprises a shock absorber of conventional construction having a coiled spring 70 (FIG. 4) encircling an inner vertical tube 152 which is mounted at its lower end 154 to a bushing 156 pivotally connected by a nut and bolt 158 to an upstanding U-shaped bracket 160 welded to the upper side of the cross plate 138. In a similar manner, an upper tube 162 of the shock absorber is connected by a nut and bolt 164 to a depending U-shaped bracket 166 welded to the underside of the seat bracket 136. The upper tube 162 telescopes on the lower tube 152, causing a flange 168 on the upper tube to compress the coiled spring 70, thereby causing the spring to push against the cross plate 138 to urge the lower telescoping tubes 130 and the ski rear end 125 downwardly.

For the purpose of strengthening the connection between the frame's foward end of the cross bar section 103 and the steering column tube 27, an inclined brace and foot support bar 170 is fastened at its upper end to the cross bar section at a location spaced from the steering tube 27, and is fastened at its lower end to the lower end of the steering column tube 27. The footrest 26 is a horizontally and transversely extending bar fastened at the lower end of the bar 170 with an upper tread-like surface upon which the rider rests his feet when the snow bob is moving. The front end of the cross bar section is secured as by welding to the top of the steering column tube 27. Additional strengthening therebetween may be provided by welding a triangular shaped plate 172 between the bar 170 and the steering tube 27.

The steering tube 27 is a generally hollow and cylindrical tube in which is journaled for turning movement, the steering post 14 by means of an upper bushing 175 and a lower bushing 176. The steering post 14 is also a hollow, cylindrical tube carrying at its upper end 178 a pair of transversely extending handlebars 16. The lower end of the steering post 14 fits in the ski mounting bracket 180 which comprises a bottom pad 182 and a pair of upstanding side flanges 184 which are apertured to receive the connecting pin 88 which also extends through a pair of apertures in the tubular steering post 14. The preferred bracket also has a rear upstanding wall 181 and is molded integral with the body 183 of the front ski 18. A pair of upper strengthening ribs 184 extend longitudinally along the upper side of the front ski body 183 and to the bracket 180 to strengthen the same. Herein, the front ski body 183 is an integral, one-piece, molded body preferably made of nylon reenforced with glass fiber. The illustrated locking pin 88 includes a circular pull ring 90 at one end and a spring loaded detent button which is forced through a hole in the upstanding side flange 184 and steering column 14 and opposite side flange 184, all in a well known manner.

As explained in greater detail in a co-pending patent application, filed of even date, and entitled "Snow Bob With a Detachable Fuel Tank," the preferred fuel tank 24 is releasably secured to and rests on the top of the front cross bar section 103 by means of a quick disconnect means. The latter comprises the clip 85, secured to the top of bar section 103 into which is inserted the lip 84 of the gas tank 24. The clip 85 has a rearwardly facing free end spaced above the top side of the cross bar 78 to define therewith a groove to receive in nesting relationship the forward tank lip 84 which is molded integrally with the gas tank. That is, the gas tank lip 84 slides between the free end of the clip 85 and cross bar 78. The bottom of the gas tank is formed with a longitudinally extending groove which is sized to receive therein the upper side of the frame cross bar 78. Likewise, an inclined and upwardly extending groove is on the rear sidewall 194 of the gas tank to receive therein the frame leg 76.

The quick disconnect means further comprises the disconnect plunger 83 which is inserted through an opening in a rear gas tank lip 196 and an opening in a rubber like grommet 198 secured in frame leg 76. A bayonet like lock plunger 83 is inserted through an opening in the fuel tank lip 196 and into the grommet 198 to hold the rear end of the tank against upward movement. As previously explained, a lower fitting 112 on the bottom of the gas tank 24 may be disconnected from the fuel line 111 to allow removal of the gas tank for separate storing or transporting. An additional and more detailed description of the detachable gas tank may be had by reference to the aforesaid co-pending patent application which is hereby incorporated by reference as if fully reproduced herein.

The power ski 30 is a true ski in that it has a pair of parallel running surfaces on the underside 121 of the ski body 119 on opposite longitudinally extending sides 197 (FIG. 4) of the endless propelling track 32. The running surfaces support a substantial portion of the weight of the rider and vehicle and limit the amount of penetration of the cleats of the propelling track into soft snow. That is, the power ski 30 is not merely a driving and propelling track but also is afforded running surfaces and with outer turning edges 199 (FIG. 4) which assist in turning and steering the vehicle. The details of the power ski's running surfaces and turning edges are fully disclosed in the aforesaid patent application on the power ski. The width of the power ski is about six inches in this illustrated embodiment of the invention which is indicative of the fact that the operator must balance the snow bob in the manner of a cycle when riding the same. Herein, the entire length of the snow bob (including the front ski) is about five feet with the rear power ski having a length of about 2.5 feet.

From the foregoing it will be seen that the present invention provides a foreshortened ski bob having a power ski disposed substantially under the seat so that the occupant's weight directly forces the power driving track into the snow. By pivotally attaching the forward end of the rear power ski at a location forwardly of the seat and by providing a lost motion and biasing means at the rear attachment means, the rear end of the power ski is free to pivot up and down while being urged into good driving relationship with the snow. The ride may be cushioned by the inexpensive shock absorbing means positioned between the pair of telescoping tubes positioned between the seat and the rear end of the power ski. In addition to locating the seat between the fore and the aft ends of the power ski, it is preferred that the rear end of the power ski be normally positioned lower than the front end of the ski so that when the rider puts on the ski the rear end of the ski will be biased to a downward position against the snow.

What is claimed is:

1. A ski bob driven by a motor and having a frame supported by a front steerable ski and a rear power driven ski and a seat attached to the frame, which seat provides an operator's position, said rear ski having running surfaces which support a substantial portion of the weight of the operator and which slide on the snow and having a continuous driving track, a forward attachment means for pivotally mounting said power ski to said frame at a location longitudinally forward of the operator's position and adjacent a front end of the seat, said continuous driving track extending from adjacent the front end of said seat to a rearward end rearwardly of the rearward end of said seat;

a rearward attachment means for attaching said power ski to said frame at a location longitudinally rearward of the operator's position;

said running surfaces extending from a location rearward of seat forwardly to adjacent the front end of said seat;

the lower surface of said running surfaces defining a plane which is higher relative to the ground at the forward portion of the running surfaces than at the rearward portion of said receiving surfaces; and biasing means for biasing the rear portion of said power ski downwardly and the operator's weight being located substantially over the rear power driven ski to urge said running surfaces and said driving track of said power driven ski into engagement with the snow when traversing a snow covered terrain.

2. A ski bob in accordance with claim 1 in which said forward attachment means comprises a pivotal connection for pivotally mounting the front end of the ski for turning about a substantially horizontal pivotal axis at a location forwardly of the operator's position and said biasing means urges said power driven ski to turn downwardly about said pivotal axis.

3. A ski bob in accordance with claim 2 in which said rearward attachment means comprises a lost motion means allowing the rearward end of said power ski to travel upwardly and downwardly relative to said seat and said biasing means cooperates with said lost motion means to cushion the operator from high impact loading due to rough terrain.

4. A ski bob in accordance with claim 3 in which said lost motion means comprises a pair of transversely spaced, telescoped tubes connected at lower ends to said power ski and connected at their upper ends adjacent a rear portion of said seat, and in which said biasing means includes a shock absorber located between said pair of telescoping tubes.

5. A ski bob in accordance with claim 1 in which said power ski has its rearward end lowered relative to its front end to assure that the rearward end penetrates into the snow.

6. In a ski bob having a motor and a seat and a front ski attached to a front steering post mounted for turning in a supporting frame and a rear power driven ski attached to the frame and disposed substantially under a seat for the operator, said rear ski having running surfaces which support a substantial portion of the weight of the operator and which slide on the snow and having a continuous driving track, the improvement comprising a frame having a generally horizontal cross portion to be straddled by the rider's legs, a steering post column fixed to the front of said cross portion and journaling the steering post therein for turning a bifurcated frame portion connected to the rear of said cross portion, said bifurcated portion having an upwardly and rearwardly extending first leg supporting the seat, the rear section of said leg being at a location substantially above said horizontal cross portion, and having a downwardly and rearwardly extending second leg pivotally mounting the front end of said power ski, said rear power driven ski being pivotally mounted to said second leg at a location adjacent a front end of said seat, said running surfaces extending from adjacent the front edge of said seat rearwardly of the rear end of said seat; and a rear attachment means connecting the rear end of said power ski to said frame.

7. A ski bob in accordance with claim 6 in which said frame further comprises an upper seat supporting portion connected to the upper and rearward end of said first leg and extending substantially over the central and rearward portions of said power ski, said rearward attachment being connected to said upper seating portion of said frame through said seat.

8. A ski bob in accordance with claim 7 in which said horizontal cross portion, said first leg, and seat supporting portion of said frame are formed from a single piece bent tubular member.

9. A power driven ski bob comprising a frame, a steering post journaled in a forward end of said frame, a front ski secured to the lower end of said steering post, a handle bar secured to the upper end of said steering post, a cross portion of said frame to be straddled by the legs of the operator;

a gas tank carried by said cross portion and straddled by the legs of the operator;

a power ski pivotally connected to the frame at the forward end of the power ski forwardly of a seat and beneath said gas tank for turning about a horizontal axis, said power ski having running surfaces which support a substantial portion of the weight of the operator and which slide along the snow, a motor and an endless track driven by said motor and carried by said power ski for propelling the ski bob, a seat mounted on said frame over said power ski for seating an operator; and means connected to said power ski rearwardly of said horizontal axis and including a biasing means biasing said power ski downwardly about said horizontal axis and into said snow, said running surfaces extending from adjacent a front end of said seat to a rearward end rearwardly of said seat, said biasing means extending to the rearward portion of said power ski from said frame.

10. A power driven ski in accordance with claim 9 in which said gas tank and said front ski are detachably mounted for removing to assist in stowing and transporting said ski bob, said gas tank being detachably mounted on said cross portion and being separable therefrom.

11. A ski bob driven by a motor and having a frame supported by a front steerable ski and a rear power driven ski and a seat attached to the frame, said rear power driven ski having running surfaces which support a substantial portion of the weight of the operator and which slide across the snow, wherein the improvement comprises:
- a forward attachment means for pivotally attaching said power ski to said frame for turning about a horizontal axis at a location adjacent a forward end of said seat, said running surfaces extending rearwardly from adjacent the forward end of said seat to rearwardly of said seat;
- a rearward attachment means for attaching a rearward end of said power ski to said frame with said rearward end of said power ski being lower than the front end of said power ski, said rearward ends of said running surfaces being lower than forward ends of said running surfaces, biasing means for biasing the rear end of said power ski to turn downwardly about said axis into the snow, and a driving track extending from adjacent the front end of said seat rearwardly beyond the rear end of said seat and driven by said motor and carried by said power ski and located directly below said seat with the operator's weight being directed by said rearward attachment means to force the running surfaces and the rear end of said driving track into engagement with the snow.

12. A ski bob in accordance with claim 11 in which said biasing means includes a shock absorber for cushioning impacts to the seat and the operator seated thereon.

* * * * *